July 18, 1939.  G. V. WOODLING  2,166,697

APPARATUS FOR DETERMINING AIR CONDITIONS

Original Filed April 22, 1932   5 Sheets-Sheet 1

INVENTOR

George V. Woodling

INVENTOR
George V. Woodling

July 18, 1939.

G. V. WOODLING 2,166,697

APPARATUS FOR DETERMINING AIR CONDITIONS

Original Filed April 22, 1932    5 Sheets-Sheet 4

Fig. 10

Values for the
Illustrated Positions.
1. Dry Bulb Temperature 90°
2. Wet Bulb Temperature 72°
3. Differential Temperature 18°
4. Relative Humidity 40%
5. Effective Temperature 80°

INVENTOR

George V. Woodling

July 18, 1939.  G. V. WOODLING  2,166,697
APPARATUS FOR DETERMINING AIR CONDITIONS
Original Filed April 22, 1932    5 Sheets-Sheet 5

| Desirable Indoor Temperature in Summer Compared to Outside Temperature | | | | | |
|---|---|---|---|---|---|
| Degrees Outside | | | Degrees Inside | | |
| D.B. | W.B. | E.T. | D.B. | W.B. | E.T. |
| 95 | 70 | 81 | 80 | 65.2 | 73.4 |
| 90 | 69 | 79 | 78 | 64.5 | 72.2 |
| 85 | 67 | 76.5 | 76.5 | 64 | 71.1 |
| 80 | 65.5 | 73.8 | 75 | 63.5 | 70.2 |
| 75 | 64 | 70.5 | 73.5 | 63 | 69.3 |
| 70 | 62 | 67 | 72 | 62.5 | 68.2 |

INVENTOR
George V. Woodling.

Patented July 18, 1939

2,166,697

UNITED STATES PATENT OFFICE 2,166,697

APPARATUS FOR DETERMINING AIR CONDITIONS

George V. Woodling, Cleveland, Ohio, assignor to General Motors Corporation, a corporation of Delaware Original application April 22, 1932, Serial No. 606,837. Divided and this application December 3, 1932, Serial No. 645,570

34 Claims. (Cl. 73—336)

My invention relates, in general, to air conditioning, and more particularly to means for measuring the condition of the air.

This application is a division of my pending application for Letters Patent, Serial Number 606,837, filed April 22, 1932, entitled Measuring and regulating devices, and which issued into Patent No. 2,139,295, Dec. 6, 1938.

An object of my invention is to provide for measuring the relative humidity and the effective temperature of air.

Another object of my invention is to give a measurement that is a true index of a person's feeling of comfort or discomfort in all combinations of the dry bulb temperature, the relative humidity and the air velocity.

A further object of my invention is to translate three movements into a single resultant movement.

A still further object of my invention is the provision of a psychrometric device that measures the effective temperature in all combinations of the dry bulb temperature, the relative humidity, and the air velocity.

Another object of my invention is the provision of a psychrometric device that is responsive to the dry and wet bulb temperatures for measuring the relative humidity.

Other objects and a fuller understanding of my invention may be had by referring to the following descriptions, taken in connection with the accompanying drawings, in which.

The effective temperature is an experimentally determined scale, and therefore represents the true index of a person's feeling of warmth in all combinations of temperature, humidity, and air motion.

The temperature sensations of the human body depend not only upon the temperature of the surrounding air as registered by a dry-bulb thermometer, but also upon the temperature as indicated by the wet-bulb thermometer, together with the air motion. Human comfort or discomfort, as regards feeling of warmth, depends largely upon the body temperature, and, therefore, upon the relation between the rate of production and dissipation of heat.

By the process of metabolism heat is constantly generated within the body, which heat must be eliminated from the surface of the body and from the respiratory tract by radiation, convection and evaporation. Hence, to maintain a constant body temperature the heat loss must equal the heat produced. It is, therefore, apparent that any reduction in the elimination of heat from the body must result in a rise in temperature and a corresponding feeling of discomfort. As the temperature of the air and surrounding objects rise, the loss of heat by convection and radiation decreases. When the air temperature reaches that of the body, the loss by radiation and convection ceases. Finally, as the air temperature exceeds that of the body, heat is transferred from the air to the body. As the temperature of the air rises and heat loss by radiation and convection decreases, the body endeavors to maintain temperature equilibrium by making available more perspiration, thus resulting in a greater heat loss by evaporation.

From the foregoing, one notes that there must necessarily exist certain combinations of air temperatures, air humidities and air motions, which produce the same total heat loss from a person by radiation, convection, and evaporation which produce the same feeling of comfort or discomfort upon the person notwithstanding variations in one or more components of said combinations.

The combinations of temperature, humidity and air movement which produce the same feeling of warmth are called thermo-equivalent conditions or effective temperature lines. Elaborate experiments show that this newly-developed scale of thermo-equivalent conditions not only indicates the sensation of warmth, but also determines the physiological effects on the body induced by heat and cold. For this reason, the thermo-equivalent condition is generally referred to as the effective temperature scale or index.

Effective temperature is an experimentally determined scale which unlike the dry-bulb and wet-bulb scales is a true measure or index of a person's feeling of warmth in all combinations of temperature, humidity, and air movements. In other words, for any one given effective temperature a person feels the same degree of warmth or coldness regardless of the dry-bulb temperature, the wet-bulb temperature, and velocity of the air required to produce that particular effective temperature.

Figure 1:
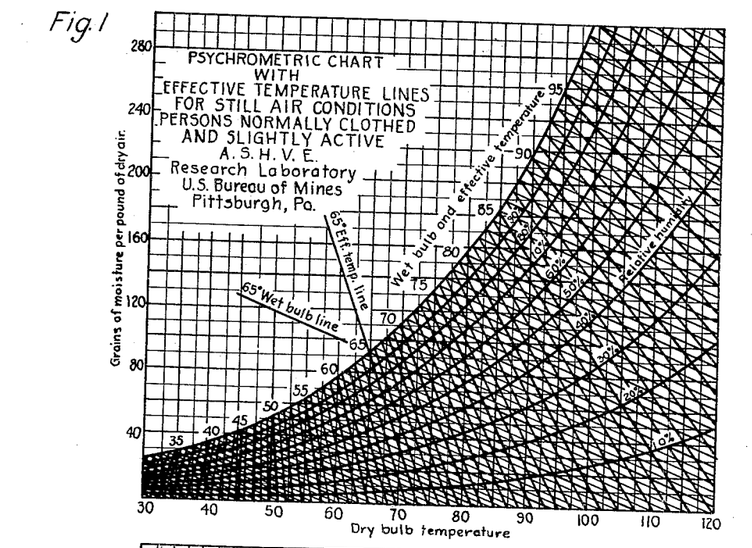
Fig. 1 is a psychrometric chart with effective temperature lines for still air conditions, persons normally clothed and slightly active.
Figure 2:
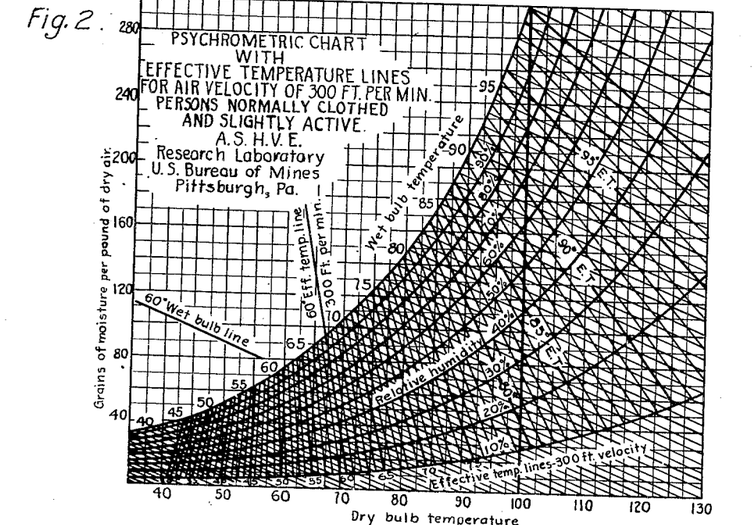
Fig. 2 is a psychrometric chart with effective temperature lines for an air velocity of 300 feet per minute, persons normally clothed and slightly active.

With reference to the two psychrometric charts of Figs. 1 and 2, the dry bulb temperature is plotted as abscissae and the grains of moisture per pound of dry air as ordinates. The maximum moisture which the air can hold at various temperatures gives the saturation, or 100 percent relative humidity curve. Relative humidities between zero and 100 percent are given by a series of curved lines similar to the saturation curve. The wet bulb temperatures for all atmospheric conditions are given by a series of nearly parallel oblique lines. Effective temperature is given by a series of oblique but not parallel lines which approach being parallel to the wet-bulb lines at high temperatures. In the psychrometric chart of Fig. 1, which is for still air, the effective temperature line is vertical and coincides with the dry bulb temperature line at 46°. In Fig. 2, which is for air moving at the rate of 300 feet per minute, the effective temperature line is vertical and coincides with the dry-bulb temperature line at 56°. Although not shown, for air velocities of 100 and 500 feet per minute the effective temperature lines and the dry-bulb temperature lines coincide respectively at 51° and 59°.

For dry-bulb temperatures below these respective values, an increase in humidity produces a cooler sensation, instead of a warmer sensation as is produced for dry-bulb temperatures above these values. The values may be called the dividing lines at which humidity has no effect upon the comfort of the body.

The psychrometric chart of Fig. 2 for moving air, differs from the chart of Fig. 1 for still air only in that the effective temperature lines for any particular degree do not intersect the dry-bulb, and wet-bulb temperature lines at the same degree on the saturation or 100 percent relative humidity curve, but are removed to the right so that the effective temperature for any dry and wet bulb temperature is lower for moving air than it is for still air. This difference between the effective temperature for still air and for moving air, of any velocity, is the cooling resulting from that velocity.

Referring to the psychrometric chart in Fig. 1, a dry-bulb temperature of 70° and a wet-bulb temperature of 54° produces an effective temperature of 65°. This is for still air. Referring to Fig. 2, which is for air moving at the rate of 300 feet per minute, the same dry and wet bulb temperatures produces an effective temperature of 60°, or a reduction of 5° resulting from a change in air velocity.

For winter-time conditions in relatively cold climates, and for persons normally clothed and slightly active, extensive tests show that the comfort zone ranges from an effective temperature of 62° F. to an effective temperature of 69° F. That particular effective temperature at which a maximum number of people feel comfortable is called the comfort line. While at rest, 97 percent of the people have been found to be comfortable at an effective temperature of 64° F., and this temperature is generally considered as the winter comfort line or optimum effective temperature. However, persons working at various rates are most comfortable at effective temperatures below 64° F. The foregoing discussion respecting the effective temperature is merely a brief restatement of the subject matter published in the Transactions of the American Society of Heating and Ventilating Engineers from 1923 to the present date by F. C. Haughten and C. P. Yaglou.

Figure 4:
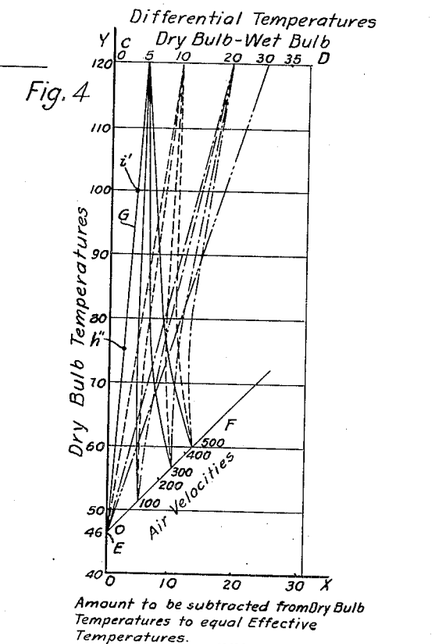
Fig. 4 is the graphical representation of a method for determining the effective temperature for all combinations of dry bulb temperatures, wet bulb temperatures, and air velocities.

Since one of the purposes of the psychrometric device is to measure the effective temperature, it follows that its functioning must be based upon a useful and practical relationship that combines the dry bulb temperature, the relative humidity, and the air motion. From a study of the psychrometric charts of Figs. 1 and 2, together with other psychrometric charts (not shown), I find that by reorganizing the foregoing values upon a different basis, a useful and practical relation results. Such a relationship is shown in Fig. 4. In this relationship, however, the relative humidity is not considered directly, but by its derived value, as determined by the dry bulb and wet bulb readings.

In Fig. 4, the dry bulb temperature is scaled off on the line OY; the amount to be subtracted from the dry bulb to equal the effective temperature on the line OX; the difference between the dry bulb and the wet bulb temperatures on the line CD; and the air velocities on the line EF.

The air velocity line, EF, is determined as follows: With reference to the psychrometric chart of Fig. 1, which is for still air, one observes that, at a dry bulb temperature of 46°, the amount to be subtracted from the dry bulb temperature to equal the effective temperature is zero. This establishes the zero point on the line EF. Similarly, with reference to the psychrometric chart of Fig. 2, which is for an air velocity of 300 feet per minute, one observes that, at a dry bulb temperature of 56°, the amount to be subtracted from the dry bulb temperature to equal the effective temperature is 10°. This establishes the point 300 on the line EF. The points for air velocities of 100, 200, 400 and 500 may be established in a similar manner.

The line CD is likewise empirically established by first plotting a family of lines which have for their base the line EF and which converge at a dry bulb temperature of 120° F. The values for plotting the family of lines are obtained from the psychrometric charts of Figs. 1 and 2, together with other similar charts (not shown). For instance, the line G, interconnecting the zero point on the line EF and the point 5 on the line CD is determined by establishing a series of points, the values of which being obtained from the psychrometric chart of Fig. 1, and drawing a line through the said points. With reference to Fig. 1, which is for still air, we observe that, at a dry bulb temperature of 75° F. and a wet bulb temperature of 70° F., (a difference of 5°), the effective temperature is 72.7° F. This means that, at a dry bulb temperature of 75° F. and with a difference of 5° between the dry bulb and the wet bulb temperatures, the amount to be subtracted from the dry bulb temperature to equal the corresponding effective temperature, is 2.3°. Therefore, with reference to Fig. 4, a dry bulb temperature of 75° F., as measured on the line OY, and a value of 2.3°, as measured on the line OX, established a point $h''$ for the line G. For the point $i'$, on the line G, we observe from Fig. 1 that the amount to be subtracted from a dry bulb temperature of 100° F., (with a wet bulb temperature of 95° F.) to equal the corresponding effective temperature, is 4°. Similarly, for the point 5, being the point where the line G intersects the line CD, we observe from Fig. 1 that the amount to be subtracted from a dry bulb temperature of 120° F., (with a wet bulb temperature of 115° F.), to equal the corresponding effective temperature, is 5.5°. Other points for establishing the position of the line, G, may be determined in the same manner. As will be noted, the established points for the line, G, lie in a straight line.

The other lines interconnecting the zero point on the line EF and the points 10, 20 and 30 on the line CD may be established in the same manner as the line, G, was established, except that the differences between the dry bulb temperatures and the wet bulb temperatures are 10, 20 and 30, respectively.

The family of lines interconnecting the point 300 on the line EF and the points 5, 10 and 20 on the line CD may also be established in a similar manner, except that the values for establishing these lines are taken from the psychrometric chart in Fig. 2, which is for an air velocity of 300 feet per minute. The values for determining the family of lines interconnecting the points 100 and 500 on the line EF and the points 5, 10 and 20 on the line CD are taken from psychrometric charts (not shown) for air velocities of 100 and 500 feet per minute, respectively. As will be observed, all of these lines are substantially straight, except those for the higher air velocities, and they may, for all practical purposes, be considered straight. While I have drawn the foregoing family of lines to explain the method as to how they are established, it is readily apparent that an infinite number of such lines may be drawn. From the reorganized psychrometric chart of Fig. 4, one observes that the family of lines converge at 120° F., thus indicating that at this high temperature the air velocity has no cooling effect upon the body. Therefore, when the chart in Fig. 4 is once established, we can obtain from it the amount to be subtracted from the dry bulb temperature to equal the corresponding effective temperature for all possible combinations of dry bulb temperature, wet bulb temperatures and air velocities. As will appear later, that part of the psychrometric device for measuring the effective temperature is based upon the chart of Fig. 4. However, before describing the structural features of the psychrometric device, I will explain the basis for directly determining the relative humidity from the dry bulb and wet bulb temperature readings.

Figure 3:
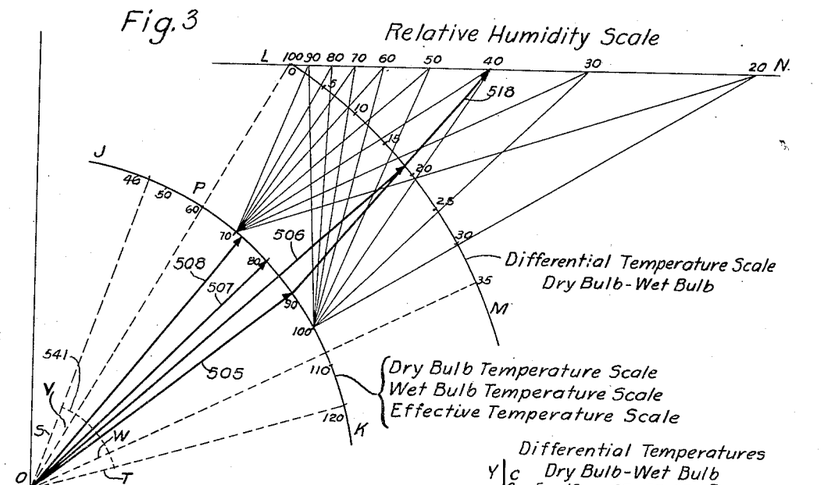
Fig. 3 is the graphical representation of a method for determining the relative humidity from the dry bulb and wet bulb temperatures.

With reference to the chart in Fig. 3, the dry bulb temperature readings are scaled off on the arcuate line JK; the difference between the dry bulb and the wet bulb temperatures on the arcuate line LM; and the relative humidity on the straight horizontal line LN. The angular position of the arcuate line LM relative to the arcuate line JK is determined by making the zero or starting point of the line LM and the dry bulb temperature reading of 60 on the line JK lie on the same radius; namely, the line OPL. The radial position of the arcuate line JK relative to the arcuate line LM is such that the distance OP equals two-thirds of the radial distance OL. However, any other ratio may be employed so long as the proper considerations of all the factors effecting the ratio are taken into account. As illustrated, the dry bulb temperature readings, as marked off on the arcuate line JK, range from 46° to 120° F., and the differential readings, as marked off on the arcuate line LM, range from 0° to 35°. These temperature readings correspond to those shown in Fig. 4, and are more than adequate to accommodate any and all possible heating and air conditioning requirements. The relative arcuate lengths of the dry bulb temperature scale JK and the differential scale LM may bear substantially the same proportion as shown. However, should it be desirable to reduce the length of the relative humidity scale LN, this may be done by reducing the arcuate length of the differential scale LM relative to the arcuate length of the dry bulb temperature scale JK. Both the position and the readings, as marked off on the relative humidity line LN, are established empirically by drawing intersecting lines through the dry bulb temperature scale JK and the differential scale LM. Referring again to the psychrometric chart of Fig. 1, we observe that a dry bulb temperature of 70° and a wet bulb temperature of 59° (a difference of 11°) give a relative humidity of 50 percent, and that a dry bulb temperature of 100° and a wet bulb temperature of 84° (a difference of 16°) likewise give a relative humidity of 50 percent. Hence, the intersection of a line drawn through 70° on the scale JK and 11° on the scale LM with a line drawn through 100° on the line JK and 16° on the scale LM determines the point for 50 percent relative humidity. Similarly, the intersection of a line drawn through a 70° on the scale JK and 14° on the scale LM with a line drawn through 100° on the scale JK and 20.5 on the scale LM determines the point for 40 percent relative humidity. As illustrated, other points for the relative humidity line LN may be determined in a similar manner. I find that, by plotting the chart shown in Fig. 3 on a large scale the working range of the relative humidity scale LN is very accurate. However, there is a slight percentage of error at the extreme ends of the scale.

That part of the psychrometric device for measuring the relative humidity is based upon the charts in Figs. 3 and 4. As far as it is possible to do so, the two parts will be described separately, even though structurally they are mutually dependent. I will describe the part concerning the relative humidity first.

With particular reference to Figs. 7, 8, 9 and 10, the reference characters 500 and 501 represent two rotatable shafts, the rotation of which are, respectively, responsive to the dry and wet bulb temperatures. Several methods, well known in the art, are available for operating the dry and wet temperature shafts, but, since this constitutes no part of my invention, I have omitted making a showing of such a means. Generally, such a means may comprise a tube containing a thermo-expansive fluid connected to a Bourdon tube helix which expands and unwinds in a well known manner to rotate the said shafts. For the dry bulb temperature shaft 500, the tube that contains the thermo-expansive fluid is exposed to the ordinary atmosphere and for the wet bulb temperature shaft 501, the tube may be either surrounded with a wick dipped into a tank of water or any other means to effect an evaporation. Also, as a modification, the dry and wet bulb shafts 500 and 501 may be remotely controlled by an electrical means that is responsve to a dry and a wet bulb thermometer.

Figure 10:
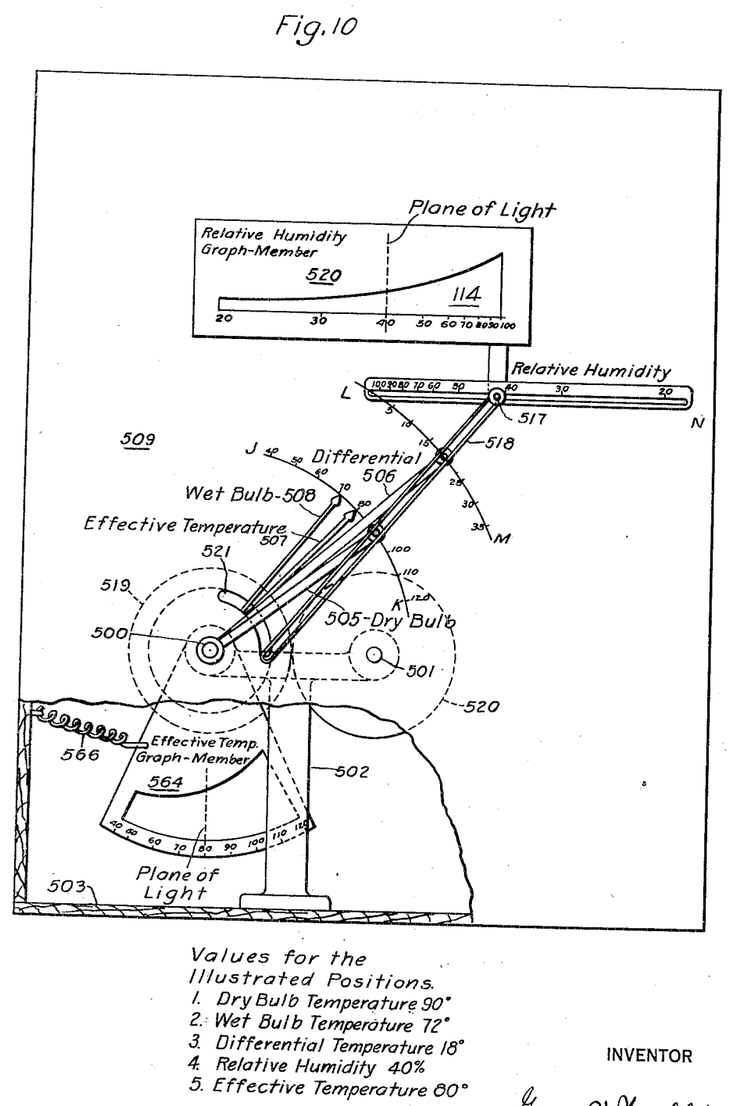
Fig. 10 is a front elevational view of the psychrometric device shown in Fig. 7, and illustrates indicating hands for the dry bulb temperature, the wet bulb temperatures, the effective temperature, and the relative humidity, together with graph-members based upon the effective temperature and the relative humidity.

As illustrated, the dry and wet bulb temperature shafts are rotatively mounted in brackets 502 which are supported by a base member 503. Through a transmission of the planetary type, the two shafts are arranged to operate a dry bulb temperature hand 505 and a differential temperature hand 506. As shown in Fig. 10, the dry bulb temperature scale JK, the differential temperature scale LM, and the relative humidity scale LN provided upon the face 509 of the psychrometric device are constructed upon the same basis as the chart shown in Fig. 3. The effective temperature hand is represented by the reference character 507 and the wet bulb temperature hand by 508. Their values are read off on the dry bulb temperature scale JK.

The dry bulb temperature shaft 500 extends through the various parts of the psychrometric device and the dry bulb temperature hand 505 is connected upon the outer or right-hand end thereof. Surrounding the dry bulb temperature shaft 500 is a hollow or tubular shaft 510, and the differential temperature hand 506 is connected to the outer or right-hand end thereof and the rear or left-hand end thereof is connected to the differential transmission. Inasmuch as the linear arcuate unit for the differential scale LM is larger than the corresponding arcuate linear unit for the dry bulb temperature scale JK, the left-hand end of the tubular shaft 510 is connected to the sun gear 512 and the dry bulb temperature shaft 500 is connected through the usual spider to the planetary gears 513 of the differential transmission. The orbit gear 514 of the transmission is driven by the wet bulb temperature shaft 501 through a gear wheel 515. In this manner, the difference in angular displacement of the dry and wet bulb temperature shafts is transmitted through the sun gear 512 and hence the tubular shaft 510 to the differential hand 506. The gear wheels of the planetary transmission are so proportioned that, for any reading of the dry and the wet bulb temperature hands 505 and 508, as marked off on the scale JK, the differential hand 506 indicates a value, as marked off on the differential scale LM, that is the difference between the dry and wet bulb temperature readings.

As illustrated, the relative humidity scale LN may be horizontally supported upon the face 509 by suitable pins 516 or their equivalents. The lower edge of the relative humidity scale is provided with a longitudinal slot in which a pin 517 is disposed to be slidably mounted. Interconnecting the pin 517 and the outer ends of the dry bulb temperature hand 505 and the differential temperature hand 506 is a slotted arm 518. Hence, as the dry bulb temperature hand 505 and the differential temperature hand assumes different relative positions, the upper end of the slotted arm 518 constrains the pin 517 to move along the longitudinal slot of the relative humidity scale LN. The position of the pin 517 determines the relative humidity reading for the corresponding readings of the dry and wet bulb temperatures.

In the position as shown, the dry bulb temperature hand 505 indicates a temperature of 90° upon the scale JK and the differential temperature of 18°. For this position of the dry bulb temperature hand 505 and the differential hand 506, the corresponding relative humidity reading is 40 percent. This particular setting of the hands is also indicated on the chart shown in Fig. 3. The heavy line 505 represents the position of the dry bulb temperature hand 505; the heavy line 506 indicates the position of the differential hand 506 and the heavy line 518 indicates the slotted arm 518. As is readily apparent, my psychrometric device provides for measuring the relative humidity for any and all possible combinations of dry bulb and wet bulb temperatures.

Figure 13:
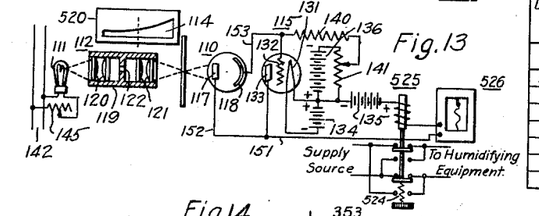
Fig. 13 is a fundamental circuit that may be associated with the psychrometric device for regulating the relative humidity of a building or enclosure at any predetermined selected value.

For the purpose of regulating the humidifying equipment of an air conditioning system, I provide a relative humidity graph-member 520 and a light projector 112 (see Figs. 10 and 13) for varying the amount of light falling upon a photo-electric cell 110 of an amplifying circuit, which, in turn, actuates a pole changer relay 525 for controlling the polarity of the current delivered to the humidifying equipment. The amplifying circuit and the light projector 112 for accomplishing this result are shown in Fig. 13.

Two well known methods are available for varying the amount of light that passes through the light transmitting portion 114 of the graph-member 520. One may be termed the "linear" method, and the other the "area" method. With reference to the light projector 112, the "linear" method may be described as follows: The light projector 112 comprises, in general, a cylindrical housing 119 in which are disposed, at the left end, two condensing lenses 120 and, at the right end, two objective lenses 121, and, in the middle, a transversely disposed member having a vertical narrow slot 122. By means of the condensing lenses 120 and the objective lenses 121, and the slit 122, the light from the concentrated filament of the lamp 111 is formed into a plane of light. The intensity of this plane of light may be suitably varied by the adjustable resistor 145 that is connected in circuit relation with the source of electrical energy 142.

As shown, this plane of light is directed perpendicularly to the plane of the transversely disposed relative humidity graph-member 520. By reason of the demagnifying effect of the lenses the width of the plane of light at its focal point, being the point at which it passes through the light transmitting portion 114, is several times smaller than the width of the slit 122. The breadth or the height of the plane of light is slightly greater than the maximum height of the light transmitting portion 114. Therefore, the quantity of light falling upon the photo-electric cell 110 is determined by the amount that the graph-member 520 is transversely moved relatively to the plane of light, or, in other words, by the height of the ordinate of the light transmitting portion 114.

The graph-member 520, may be constructed either of a thin sheet of opaque material or of a photographic film. When the graph-member 520 is constructed of a thin sheet of opaque material, the light transmitting portion 114 takes the form of an aperture, but when a photographic film is used, the light transmitting portion 114 is transparent while the surrounding portion is dark. In the case of a photographic film it is essential that the degree of transparency be uniform throughout the light transmitting portion 114. By utilizing a photographic film, the graph-member may be plotted on an enlarged scale and reduced to a size applicable for the photo-electric cell by taking a reduced photograph of the enlarged graph-member. This makes a very accurate and convenient method of making graph-members. As is apparent, the maximum height of the light transmitting portions of the graph-members must not exceed the illumination boundaries of a photo-electric cell.

The relative humidity graph-member 520 is connected to the upper end of the slotted arm 518 and may be slidably mounted in any suitable manner with reference to the light source 111 and the photo-electric cell 110 of the amplifying circuit of Fig. 13. With reference to the relative humidity graph-member 520, the vertical dotted line represents the plane of light. In order to make the showing of the hands of the psychrometric device as clear as possible, I have omitted the relative humidity graph-member 520 in Fig. 7. The base of the light transmitting portion of the relative humidity graph-member 520 is the same length as the relative humidity scale LN and to every relative humidity value, as marked off on the base of the light transmitting portion there corresponds an ordinate of the same value. Therefore, the amount of light falling upon the photo-electric cell 110 is directly proportional to the readings of the relative humidity.

The photo-electric cell 110 is a light-sensitive device which, when connected to a circuit of the proper potential and when illuminated from a suitable source, passes a very small amount of current of the order of micro-amperes. The photo-electric cell 110 comprises, generally, an anode 117 and a cathode 118 sealed within either an evacuated space or within a space filled with a gas at a very low pressure. The cathode 118 is constructed of a material that has the property of liberating electrons when illuminated. By impressing a potential of the proper polarity and magnitude between the anode 117 and the cathode 118, the liberated electrons move toward the anode 117, thus effecting a passage of current in response to the light falling upon the cathode 118. Throughout the usual range of illumination, the current passed by a photo-electric cell is directly proportional to the illumination.

As is well known in the art, the feeble current that is passed by a photo-electric cell may, by means of either thermionic amplifiers or by grid-controlled glow-discharge tubes, be effectively amplified to operate electrical meters and sturdy relays. Each type of amplification has certain distinct advantages over the other.

Under correct and proper operating conditions, the output of a thermionic amplifier is directly proportional to the light falling upon the photo-electric cell, whereas this is not exactly true with grid-controlled glow-discharge tubes. However, with the proper circuits, a fair degree of proportionality can be obtained by utilizing grid-controlled glow-discharge tubes. By reason of the high degree of proportionality, the combination of the photo-electric cell and the thermionic amplifiers, provides a good light meter and may, therefore, be suitably adapted to give calibrated indications and to operate pilot relays.

Although there are many amplifying circuits utilizing thermionic amplifiers with either direct or alternating current, or with one or more stages of amplification, I have preferably illustrated in Fig. 13, a simple direct current thermionic amplifying circuit having only one stage of amplification. However, it is to be understood that I do not intend to limit my invention to the illustrated embodiment.

The illustrated amplifying circuit of Fig. 13 comprises, in general, the thermionic tube 115 having a filament 131, a grid 132, and a plate 133, a grid resistor 140, a grid potentiometer 141 for biasing the potential of the grid 132, relative to the filament 131, a filament battery 134, a plate battery 135, and a grid potentiometer battery 136. The plate battery 135 and the grid potentiometer battery 136 are connected in series circuit relation so that the sum of their voltages, except as modified by the grid potentiometer 141, is impressed across the anode 117 and the cathode 118 of the photo-electric cell 110.

In operation, when no light is falling upon the photo-electric cell 110, it passes no current, with the result that the grid 132 of the thermionic tube 115 is sufficiently negatively charged with respect to the filament 131, as determined by the setting of the grid potentiometer 141, that the value of the impedance between the plate 133 and the filament 131 is sufficiently high that very little, if any, plate current flows through the thermionic tube 115. However, when the photo-electric cell 110 is illuminated, it passes a current for decreasing the impedance of the thermionic tube 115. The current passed by the photo-electric cell 110 flows from the positive terminal of the battery 135 through the winding of the relay 525, the relative humidity recording meter 526, conductors 151 and 152, the anode 117 and the cathode 118 of the photo-electric cell, a conductor 153, the grid resistor 140, the grid potentiometer 141, and to the batteries 136 and 135. The current flowing through the photo-electric cell 110 causes a voltage drop over the grid resistor 140 in such direction as to cause the grid 132 to become less negatively charged with respect to the filament 131, with the result that the impedance of the thermionic tube 115 decreases. A decrease in the impedance of the thermionic tube 115 allows a plate current to flow from the positive terminal of the battery 135 through the winding of the relay 525, the recording meter 526, the plate 133 and the filament 131 of the thermionic tube, and to the negative terminal of the battery 135.

The amplifying characteristics of a thermionic tube is linear, except at the two extreme ends of the grid bias voltage. Therefore, in view of the fact that the responses of the photo-electric cell is also linear, the quantity of current that flows through the plate circuit of the thermionic tube 115 is linear with respect to the amount of light falling upon the photo-electric cell 110. Because of the linear amplifying characteristics of the thermionic tube, the current that flows through the coil of the relay 525 and the winding of the recording meter 526 is likewise directly proportional to the readings of the relative humidity.

A spring 524 having an adjustment nut is adapted to bias the armature of the relay downwardly and thus oppose the magnetic force of the coil of the relay. The circuit connections for the contacts of the relay 525 constitute a pole changer such that, when the magnetic pull of the coil is greater than the spring bias, the armature is in the raised position and a current of one polarity is delivered from the supply source to the humidifying equipment, and when the magnetic pull is less than the spring bias, the armature is in the lowered position and a current of the opposite polarity is delivered from the supply source to the humidifying equipment. When the armature of the relay is balanced, no current is delivered to the humidifying equipment. Inasmuch as the humidifying equipment constitutes no part of my invention, I have omitted making a showing thereof. Briefly, the operation of the humidifying equipment may be such that, when a current of one polarity is delivered thereto, the humidifying equipment responds to increase the moisture content of the surrounding air, and when no current or when a current of the opposite polarity is delivered thereto, the humidifying equipment responds to deliver no moisture content to the surrounding air. This means that, by adjusting the tension of the spring 524, the humidifying equipment may be so regulated as to maintain the relative humidity of the surrounding air at a predetermined selected value. Also, there will be described on the paper of the recording meter 526 a graph of the relative humidity readings.

Figures 14, 15:
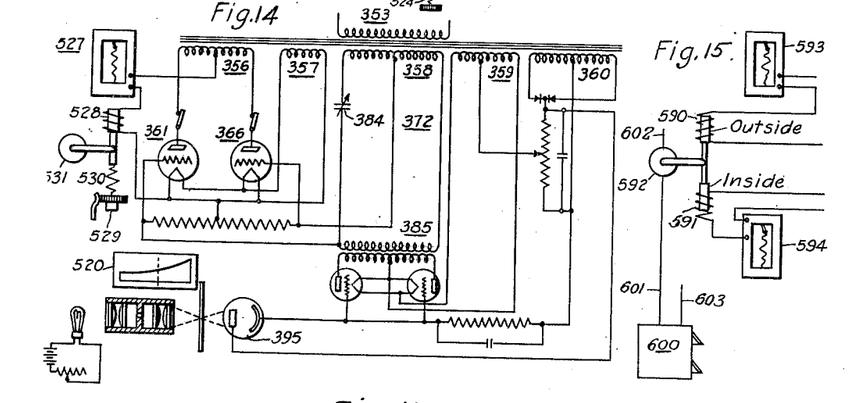
Fig. 14 is a modified form of the circuit shown in Fig. 13, and employs grid-controlled glow-discharge tubes for operating the air conditioning equipment.
Fig. 15 is a fragmentary showing of a control system wherein the electro-magnets that operate the air conditioning equipment may be operated by a control circuit employing grid-controlled glow-discharge tubes, such as the circuit shown in Fig. 14.

In Fig. 14, I show a modified form of a relative humidity control circuit, in which power grid-glow tubes 361 and 366 are employed to pass sufficient current to actuate a relatively large electromagnet 528 that may be mechanically connected to an operating valve 531 of the humidifying equipment. This circuit is substantially the same as the control circuit shown in Fig. 35 of my pending application for Letters Patent, Serial No. 606,837, filed April 22, 1932, entitled Measuring and regulating devices, and like reference characters represent like parts, the only difference being that the power grid-glow tubes 361 and 366 deliver current to the electromagnet 528 instead of to the armature of the dynamo-electric machine 350 and that the amount of light falling upon the photo-electric cell 395 is determined by the relative humidity graph-member 520 of the psychrometric device instead of the graph-member 401 of the electrical meter 394. As illustrated, a relatively strong spring 530 having an adjustment nut 529 is adapted to oppose the magnetic force of the electromagnet 528. As is apparent, this modified form of humidity control is very sensitive and, accordingly, the modulations or the variations from a normal or predetermined selected relative humidity value is reduced to a minimum. As illustrated, a recording meter 527 is connected in series circuit relation with the electromagnet 528 and thus a graph of the relative humidity readings will be described on the recording paper thereof. Therefore, from the foregoing, it is observed that my psychrometric device provides for measuring and recording the relative humidity for any and all possible combinations of dry and wet temperature readings, as well as for so regulating the humidifying equipment of an air conditioning system that the relative humidity of the surrounding air is maintained at a predetermined selected value.

As illustrated, the inner end of the wet bulb temperature hand 508 passes through a suitable arcuate aperture 521 in the dial or face 509 and is connected to the rim of a gear wheel 519, which is rotatively and freely mounted upon the tubular shaft 510 immediately in rear of the dial or face 509. The gear wheel 519 meshes with a gear wheel 520 that is mounted on the right end of the wet bulb shaft 501. The gear wheels 519 and 520 have the same diameters and, accordingly, any angular displacement of the wet bulb shaft 501 is directly transmitted to the wet bulb temperature hand 508.

Figure 7:
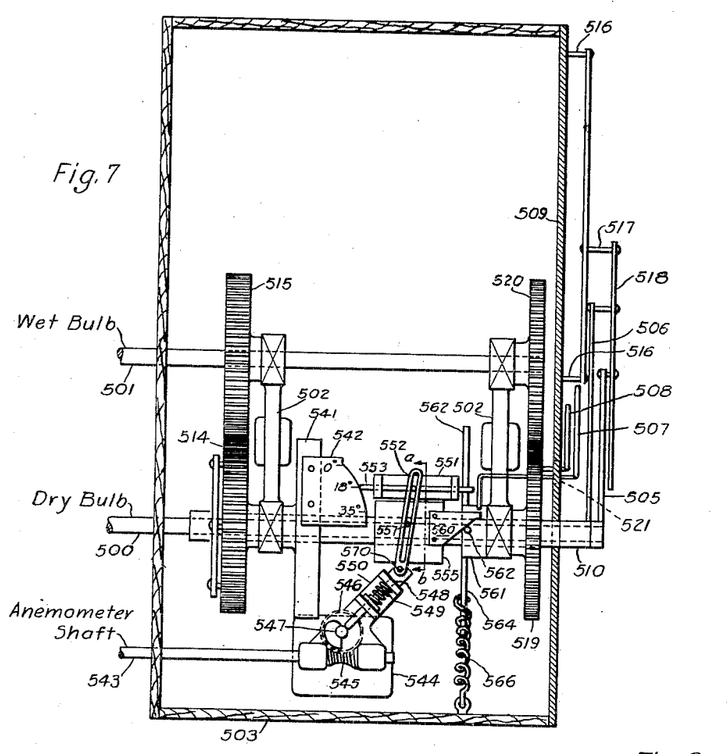
Fig. 7 is a plan view of a psychrometric device that measures both the relative humidity for all combinations of dry and wet bulb temperatures, and the effective temperature for all combinations of the dry and wet bulb temperatures, together with the air velocities.
Figure 8:
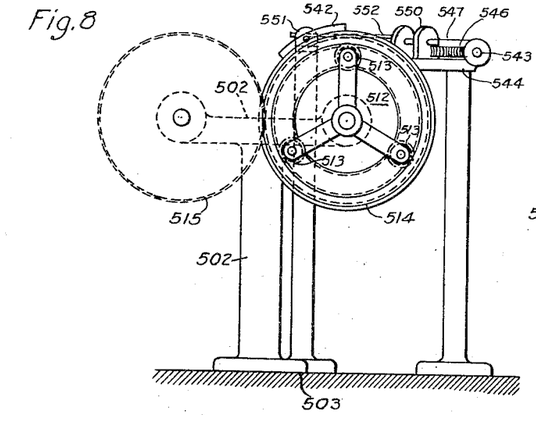
Fig. 8 is a rear elevational view of the psychrometric device, shown in Fig. 7.
Figure 9:
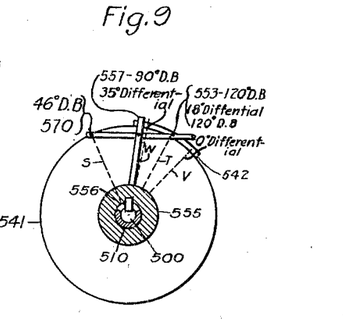
Fig. 9 is a view taken along the lines a—b of Fig. 7, part of the elements being omitted to clarify the view, as well as to explain the relative angular displacements of the various parts.

As hereinbefore mentioned that part of the psychrometric device for measuring the effective temperature is based upon the reorganized psychrometric chart of Fig. 4. In view of the fact that several ways may be employed to measure the effective temperature, as based upon the chart in Fig. 4, I do not intend to be limited by the illustrated embodiment. In carrying out my invention, the principal object is to subtract a value (subtrahend) from the reading of the dry bulb temperature (minuend) such that the remainder equals the effective temperature. With reference to Figs. 7 and 9, I propose to perform this subtraction by utilizing the combination of a slidably mounted collar 555 having a cam 560 mounted thereon which engages a pin 562 that is carried by a second collar 561 to which the inner end of the effective temperature hand 507 is connected. As illustrated, the inner end of the effective temperature hand 507 passes through the arcuate aperture 521 in the dial or face 509 and thence through a suitably provided aperture in the web of the gear wheel 519 to the point where it is connected to the collar 561. As shown in Fig. 9, a part of the tubular shaft 510 is slotted where the collar 555 is keyed by means of the key 556, or other suitable means, to the dry bulb temperature shaft 500. In this manner, the collar 555 may move axially but is constrained to move angularly with the dry bulb temperature shaft 500. Therefore, by axially moving the slidably mounted collar 555 to the right, the cam 560 engages the pin 562 and rotates the collar 561 that carries the effective temperature hand 507 backwards so that the effective temperature hand reads a value less than the dry bulb temperature hand 505 by an amount equal to the subtrahend. In other words, the axial displacement of the collar 555 and, consequently, the backward rotation of the collar 561 corresponds to the subtrahend values, as marked off on the line OX of Fig. 4. Therefore, it remains to show how the axial displacement of the collar 555 is governed by the combination of the dry bulb temperature, the differential temperature, and the air velocity. To this end, I provide a slotted arm 552, in which the upper end of a pin 557 that is connected to the collar 555 is disposed to slide when the dry bulb temperature shaft 500 is rotated between the dry bulb temperature readings of 46° and 120°. The lower end of the slotted arm 552 is pivotally connected at a pivot-point 570 to a slidably mounted member 548 that is actuated in accordance with the air velocity, and the upper end of the slotted arm 552 is actuated by a slide bar 553 that is governed in accordance with the differential temperature.

Figure 5:
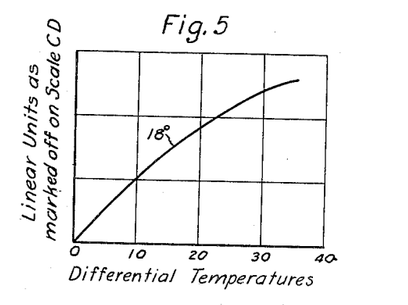
Fig. 5 is a graph showing the relationship between the linear displacement plotted against the numerical values, as marked off on the line CD of Fig. 4.

The slide bar 553 is carried by a suitable bracket 551 and the left end thereof is adapted to engage a cam 542 that is suitably mounted upon the periphery of a disc 541 which may be keyed, or otherwise connected, to the tubular shaft 510. The shape of the cam 542 is based upon the graph in Fig. 5, which represents the relationship between the linear units, as marked off on the differential temperature scale CD of Fig. 4 and the corresponding differential temperatures. Therefore, the upper end of the slotted arm 552 is actuated in accordance with the differential temperature. In the position as shown, the differential temperature is 18°.

Figure 6:
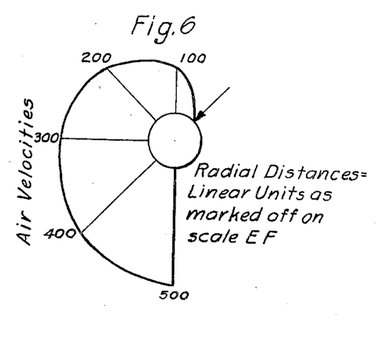
Fig. 6 is a graph showing the relationship between the linear displacement plotted against the numerical values, as marked off on the line EF of Fig. 4.

The lower end of the slotted bar 552 is actuated in accordance with the air velocity. The reference character 543 represents a shaft that is adapted to be rotated by an anemometer (not shown). For this particular application, the anemometer may be of the vane type, wherein the position of the vane is determined by the force or velocity of the air. No showing of the anemometer is included in the drawings because it constitutes no part of my invention. The end of the anemometer shaft 543 is provided with a worm 545 which engages a worm wheel 546 that rotates a polar cam 547, all of which is carried by a suitable support 544. Extending outwardly at an angle equal to the angle that the line EF makes with the line OX of Fig. 4 is a bracket 550 having upwardly extending spaced ears in which the member 548 is slidably mounted. The lower end of the slidably mounted member 548 engages the periphery of the polar cam 547. A spring 549 disposed between the upwardly extending spaced ears and surrounding the member 548 is adapted to bias the lower end of the member 548 against the polar cam 547. The shape of the polar cam 547 is based upon the polar graph in Fig. 6, which represents the polar relationship between the linear units, as marked off on the line EF of Fig. 4, and the corresponding air velocities. Therefore, the slidably mounted member 548 may be moved in-and-out by the rotation of the anemometer shaft 543 so that the position of the pivot-point 570 corresponds to the air velocity values, as marked off on the line EF of Fig. 4. In the position as shown, the arm 552 may assume any one of an infinite number of positions and, at any one setting, it is analogous to one of the family of lines interconnecting the lines EF and CD of Fig. 4.

With reference to Figs. 3 and 9, the axial position of collar 555 is determined as follows: The arcuate line 541 of Fig. 3 is struck on the same radius as the circumference of the disc 541 of Fig. 7, and the pivot-point 570 is determined where the radius line S (corresponding to 46° DB) intersects the arcuate line 541 (Fig. 3) or the circumference of the disc 541 (Fig. 7), and the arcuate position of the slide rod 553 relative to the pivot-point 570 is determined by the insertion of the radius line T (corresponding to 120° DB) with the arcuate line 541 (Fig. 3) or the circumference of the disc 541 (Fig. 7). In the position, as indicated, the pivot-point 570 therefore represents a dry bulb temperature of 46° and the position of the slide rod 553 always represents a dry bulb temperature of 120°. The pin 557 is positioned at a dry bulb temperature of 90° by shaft 500 and collar 555. Also the intersection of the radius lines V (or 0° differential) and W (or 35° differential) with the arcuate line 541 (Fig. 3) or the circumference of the disc 541 (Fig. 7) determines the arcuate length of the cam 542. In the position as shown, the disc 541 has been rotated by the shaft 510 in a clockwise direction to the point where a differential temperature of 18° on the cam 542 coincides with the engaging end of the slide rod 553. Therefore, the slidably mounted collar 555 is axially actuated to the right to such a position that the cam 560, in combination with the pin 562 and the collar 561, retracts the effective hand 507 an angular distance equal to 10°. This means that with a dry bulb temperature of 90° and a wet bulb temperature of 72° (a difference of 18°) the effective temperature is 80°, or 10° less than the dry bulb temperature reading.

Depending from the collar 561 is an effective temperature graph-member 564. The light transmitting portion of the effective temperature graph-member 564 has an arcuate base line with effective temperature readings ranging from 46° to 120° and to every value of the temperature reading there corresponds an ordinate of equal value. In the position as shown in Fig. 10, the plane of light is represented by the dotted line and it is passing through the light transmitting portion at an effective temperature reading of 80°. A spring 566 is connected to this graph-member in order to bias the effective hand in a clockwise direction, thus causing the pin 562 to yieldingly engage the edge of the cam 560. This causes a longitudinal force to be exerted upon the slidably mounted collar 555, with the result that the slide rod 553 is likewise yieldingly constrained against the cam 542.

As is apparent, by means of the effective temperature graph-member 564, in combination with a photo-electric cell and suitable amplifying circuit and an appropriate relay for regulating the control current delivered to the air conditioning equipment, the condition of the air in a building may be maintained at a predetermined selected effective temperature.

Figure 11:
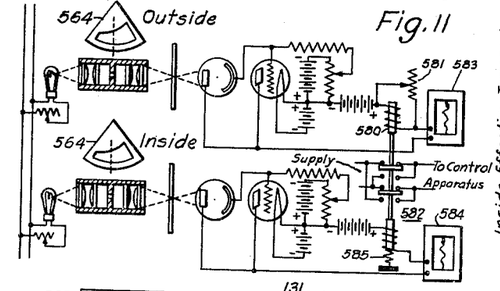
Fig. 11 is a diagrammatic view of two fundamental circuits that may be associated with two psychrometric devices for regulating the effective temperature of the air inside of a building in accordance with the effective temperature of the air surrounding the building.
Figure 12:
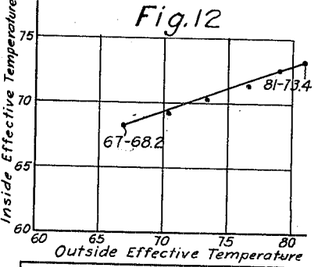
Fig. 12 is a graph, together with a chart upon which it is based, showing the desirable inside effective temperatures as compared to the outside effective temperatures.

In theatres and department stores, which are cooled artificially in warm weather, the contrast between the outdoor and indoor air conditions, becomes the deciding factor in regard to the most desirable effective temperature to be maintained in the inside of the building. The object of cooling theatres in the summer is not to reduce the effective temperature to the optimum value, but to maintain therein a reasonably comfortable effective temperature and at the same time to avoid sensations of chill or of intense heat in entering and leaving the building. The relationship between desirable indoor effective temperature in summer corresponding to various outdoor effective temperatures is plotted in Fig. 12. The effective temperature values for the curve in Fig. 12 are listed in the chart immediately below the figure. All of these values listed in the chart, except those for the outside effective temperatures, were taken from a table appearing on page 82 of the 1931 edition of the American Society and Heating and Ventilating Engineer's Guide. The values appearing in the outside effective temperature column were taken from the psychrometric chart in Fig. 1, using the corresponding outside dry and wet bulb temperatures with the same number of grains of moisture per pound of dry air. It is noted that the effective temperature values for the curve in Fig. 12 substantially define a straight line and for all practical purposes it may be considered as such, and that the higher the effective temperature on the outside, the higher the corresponding effective temperature on the inside. Therefore, from the foregoing, we observe that the control circuits which regulate the air conditioning equipment must be such as to respond to both the outside and inside effective temperatures. Such a control circuit is shown in Fig. 11. In general, this control circuit comprises two independent amplifying circuits, which differentially act to operate a relay for reversing the polarity of the current delivered from the supply source to the control apparatus of the air conditioning equipment. This means that at least two psychrometric devices must be utilized; one placed on the outside of the building and the other located on the inside of the building. The upper amplifying circuit is responsive to the outside effective temperatures and the plate current that flows through the coil 580 is disposed to exert a force that opposes the force set up by the plate current that flows through the coil 582, which is responsive to the inside effective temperatures. The spring 585 having an adjustment nut is likewise arranged to oppose the magnetic force of the coil 582. As illustrated, an adjustable resistor 581 is connected in shunt with the coil 580, so that the magnetic force of the coil 580 is relatively weak as compared to the magnetic force of the coil 582. The relative values of the magnetic force of the coils 580 and 582, together with the spring force, are such that, for example, with an outside effective temperature of 68.2° and with an inside effective temperature of 67° the armature of the relay is balanced and the air conditioning equipment is inoperative. However, should the outside effective temperature rise, the balanced condition of the relay is disturbed, because the amplifying circuit that is responsive to the outside air conditions passes more current to increase the magnetic pull of the coil 580. This causes the air conditioning equipment to respond until the inside effective temperature is raised to a point where the armature of the relay again becomes balanced. In other words a change in the outside effective temperature causes such a change in the inside effective temperature that the relationship conforms substantially with the curve shown in Fig. 12, or with any other desirable relationship which gives the most comfortable feeling.

As illustrated, a recording meter 583 and a recording meter 584 may be employed to record the outside and inside effective temperatures readings, respectively.

In Fig. 15, I show a fragmentary view of a modified form of the effective temperature control circuits, in which two power grid-glow tube circuits, such as the one illustrated in Fig. 14, may be employed to operate a valve 592, or other control means of the air conditioning equipment, by means of two electro-magnets 590 and 591 directly connected thereto, which are energized by the power grid-glow tubes. Also two recording meters 593 and 594 may be utilized to record, respectively, the outside and inside effective temperatures.

As shown in Fig. 15, the valve 592 may, for example, control the flow of a heating medium in a pipe 602 leading to a conventional radiator (not shown). Hot water or steam may be supplied to the valve from a heating plant 600 provided with the usual riser pipe 601 and return pipe 603.

Figure 16:
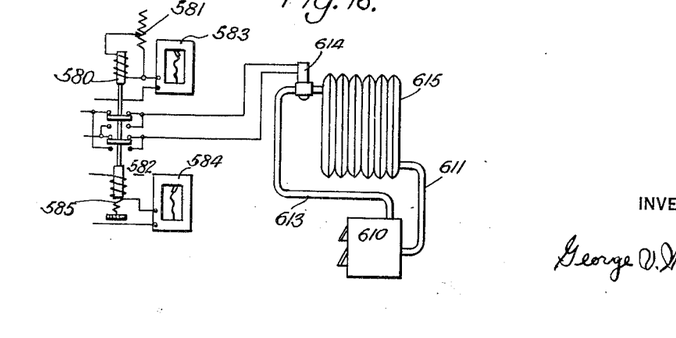
Fig. 16 is a diagrammatic view showing conventional air conditioning apparatus which may be controlled by the control system shown in Fig. 11.

In Fig. 16 I have shown a conventional conditioning apparatus which may be controlled by means of a control system of the type shown in Fig. 11. Reference numeral 610 designates a conventional heating plant which is adapted to supply a heating medium such as steam or hot water to the usual form of radiator 615. A solenoid valve 614 is shown in the riser pipe 613 for controlling the flow of the heating medium through the radiator 615. The solenoid valve 614 is controlled by a magnetically operated switch of the type shown in Fig. 11.

Inasmuch as the effective temperature is a measure of any and all possible combination of the dry bulb temperature, the relative humidity, and the air velocity, the effective temperature control circuits of Figs. 11 and 15 may regulate any one of the three factors while the other two may be allowed to vary uncontrolled. For example, if the control circuits of Figs. 11 and 15 are arranged to regulate the dry bulb temperature only, the relative humidity and the air velocity may vary uncontrolled, because the dry bulb temperature remains at the same predetermined selected value. In other words, my effective temperature control system is such that, for any change in the relative humidity or the air velocity which results in a change in the effective temperature, the dry bulb temperature is corrected to off-set the said change in the effective temperature caused by the change in the relative humidity and the air velocity. Therefore, even though the relative humidity and the air velocity may vary uncontrolled, the effective temperature is maintained at a predetermined selected value. In those cases where the air velocity is held constant, it is not necessary to use an anemometer, but the position of the slidably mounted member 548 may be adjustably set, by a set screw or other suitable means, at values that correspond to the predetermined selected constant air velocity.

It is to be pointed out that the amplifying circuits used through my invention are merely illustrative and, accordingly, they may take other forms. In the illustrated forms, the constancy or calibration of the circuits remain very accurate over a reasonable length of time, which is usually at least a year or more and this condition will improve with the manufacture of better tubes. However, should the operating conditions require that no change in the calibration take place over a period of several years, a nul method may be employed, which counterbalances any change in the calibration.

Since certain changes in my invention may be made without departing from the spirit and scope thereof, it is intended that all matters contained in the foregoing description and shown in the accompanying drawings shall be interpreted as illustrative and not in a limiting sense.

I claim as my invention:

1. A measuring device for measuring the effective temperature in all combinations of the dry-bulb temperature, the wet-bulb temperature, and the air motion comprising, in combination, means controllable in accordance with the dry bulb temperature, means controllable in accordance with the wet bulb temperature, means controllable in accordance with the air motion, differential means governed by the dry bulb temperature means and the wet bulb temperature means, and means governed by the dry bulb temperature means, the differential means, and the air motion means for giving the measurement of the effective temperature.

2. A measuring device for giving a measurement of the relative humidity based upon the dry-bulb temperature and the wet-bulb temperature comprising, in combination, means controllable in accordance with the dry-bulb temperature, means controllable in accordance with the wet-bulb temperature, differential means governed by the dry-bulb temperature means and the wet-bulb temperature means, a relative humidity scale, and a relative humidity member disposed to move along the relative humidity scale and actuated by the dry-bulb temperature means and the differential means for giving the measurement of the relative humidity.

3. A measuring device for giving a measurement of the relative humidity based upon the dry-bulb temperature and the wet-bulb temperature comprising, in combination, means rotatable in accordance with the dry-bulb temperature, means rotatable in accordance with the wet-bulb temperature, differential means rotatable by the dry-bulb temperature means and the wet-bulb temperature means, a relative humidity scale, and a relative humidity indicating hand disposed to move along the relative humidity scale and actuated by the rotational movements of the dry-bulb temperature means and the differential means.

4. A measuring device for giving a measurement of the effective temperature under conditions of substantially constant air motion and a measurement of the relative humidity both measurements of which being based upon the dry-bulb temperature and the wet-bulb temperature comprising, in combination, means controllable in accordance with the dry-bulb temperature, means controllable in accordance with the wet-bulb temperature and two separate means governed respectively by both of the two foregoing means, one of said separate means having graduations and actuating connection to give the measurement of the effective temperature under conditions of substantially constant air motion and the other separate means being adapted to give the measurement of the relative humidity.

5. A measuring device for measuring the relative humidity and the effective temperature in all combinations of the dry-bulb temperature, the wet-bulb temperature, and the air motion comprising, in combination, means controllable in accordance with the dry-bulb temperature, means controllable in accordance with the wet-bulb temperature, means controllable in accordance with the air motion, differential means governed by the dry-bulb temperature means and the wet-bulb temperature means, means governed by the dry-bulb temperature means and the differential means for measuring the relative humidity, and means governed by the combination of the dry-bulb temperature means, the differential means, and the air motion means for measuring the effective temperature.

6. A device for giving a measurement that is based upon the dry-bulb temperature and the moisture comprising, in combination, means for giving a measurement of the dry-bulb temperature, means responsive to the moisture and the dry-bulb temperature for giving a subtra-hend value, and means for subtracting the subtrahend value from the measurement of the dry-bulb temperature to give the said measurement.

7. A device for giving a measurement of the effective temperature in combinations of air motion and temperature, which measurement is an index of the thermo-equivalent condition of the body under conditions having a substantially constant relative humidity comprising means independent of the temperature and influenced by the air motion and means influenced by the temperature and means influenced by both of said means for giving the said measurement.

8. A device for giving a measurement of the effective temperature in combinations of air motion and temperature, which measurement is an index of the thermo-equivalent condition of the body under conditions having a substantially constant relative humidity comprising, in combination, means for giving a measurement of the dry-bulb temperature, means independent of temperature and responsive to the air motion for giving a subtra-hend value, and means for subtracting the subtra-hend value from the measurement of the dry-bulb temperature to give the said measurement.

9. A device for giving a measurement of the effective temperature in combinations of air motion and temperature, which measurement is an index of the thermo-equivalent condition of the body under conditions having a substantially constant relative humidity comprising, in combination, means influenced by the dry-bulb temperature, means independent of temperature and influenced by the air motion, and means receiving motion from each of said foregoing means and resolving said motion into a resultant movement of its own for giving the said measurement.

10. A device for giving a measurement based upon air motion, moisture, and temperature comprising means independent of temperature and influenced by the air motion, means influenced by the moisture, and means influenced by the temperature for giving the said measurement, and connections between said means such that the rate at which the air motion influences the said measurement is greater at lower temperatures than at higher temperatures and that the rate at which the moisture influences the said measurement is greater at higher temperatures than at lower temperatures.

11. A measuring device for indicating the sensation of temperature condition produced upon a person by relative condition of the air based upon the combination of the dry bulb temperature, the moisture content, and the motion thereof, comprising, in combination, means influenced by the dry bulb temperature, means influenced by the moisture content, means controllable in accordance with the air motion, and means governed by the three foregoing means for giving said indication.

12. A device for giving a measurement that is based upon both the moisture and the dry bulb temperature comprising, in combination, means responsive to the moisture, means responsive to the dry bulb temperature, connecting means including a movable member connected to and actuated by the two foregoing means for giving the said measurement, and said connecting means including means for causing the moisture means to affect the movable member with a greater movement only as the dry bulb temperature increases above the temperature at which a change in moisture has no influence on the effective temperature.

13. A device for giving a measurement that is based upon both the moisture and the dry bulb temperature comprising, in combination, means responsive to the dry bulb temperature, means responsive to the moisture, connecting means receiving motion from each of said foregoing means and resolving said motion into a resultant movement of its own for giving the said measurement, and means for causing the moisture means to produce substantially no part of said resultant movement at a predetermined low temperature.

14. A measuring device for giving a measurement of the effective temperature in combinations of moisture and temperature, which measurement is an index of the thermo-equivalent condition of the body under conditions of substantially constant air motion comprising, in combination, means controllable in accordance with the dry bulb temperature, means controllable in accordance with the moisture, a dry bulb temperature indicating member controlled by the dry bulb temperature means, an effective temperature indicating member controlled by the dry bulb temperature means and the moisture means, graduations to indicate the measurement of the dry bulb temperature and the effective temperature, said graduations being scaled off on substantially the same proportionate basis and calibrated with the same temperature readings, and means for causing the moisture means to make the effective temperature member read less than the dry bulb temperature member.

15. A measuring device for giving a measurement of the effective temperature in combinations of moisture and temperature, which measurement is an index of the thermo-equivalent condition of the body under conditions of substantially constant air motion comprising, in combination, graduations to indicate the measurement of the dry bulb temperature and the effective temperature, said graduations being calibrated with the same temperature readings, means controllable in accordance with the dry bulb temperature to indicate the dry bulb temperature reading, means carried by the dry bulb temperature means to indicate the effective temperature reading, means controllable in accordance with the moisture, means for causing the dry bulb temperature means and the moisture means to actuate the effective temperature indicating means, and means for causing the moisture means to make the effective temperature indicating means to read less than the dry bulb temperature means.

16. A measuring device for giving a measurement of the effective temperature in combinations of moisture and temperature, which measurement is an index of the thermo-equivalent condition of the body under conditions of substantially constant air motion comprising, in combination, a common scale to indicate the measurement of the dry bulb temperature and the effective temperature, means controllable in accordance with the dry bulb temperature to indicate the dry bulb temperature reading, means to indicate the effective temperature reading, means controllable in accordance with the moisture, means for causing the dry bulb temperature means and the moisture means to actuate the effective temperature indicating means, and means for causing the moisture means to make the effective temperature indicating means to read less than the dry bulb temperature means.

17. A measuring device for giving a measurement of the effective temperature in combinations of moisture and temperature, which measurement is an index of the thermo-equivalent condition of the body under conditions of substantially constant air motion comprising, in combination, a member movable about an axis to measure the dry bulb temperature, a member movable about the same axis to measure the effective temperature, means controllable in accordance with the moisture, and means for causing the dry bulb temperature member and the moisture means to actuate the effective temperature member.

18. A device for giving a measurement of the effective temperature in combinations of moisture and temperature which measurement is an index of the thermo-equivalent condition of the body under condition of substantially constant air motion comprising, in combination, means influenced by the dry bulb temperature, means influenced by the moisture, a movable member for giving a measurement of the effective temperature in combinations of moisture and temperatures, means governed by the dry bulb temperature means and the moisture means for actuating the effective temperature member, means for causing the dry bulb temperature means to produce a relatively large part of the movement of the effective temperature member, and means for causing the moisture means for producing a relatively small part of the movement of the effective temperature member.

19. A device for giving a measurement of the effective temperature in combinations of moisture and temperature which measurement is an index of the thermo-equivalent condition of the body under condition of substantially constant air motion comprising, in combination, means influenced by the dry bulb temperature, means influenced by the moisture, a movable member for giving a measurement of the effective temperature in combinations of moisture and temperatures, means governed by the dry bulb temperature means and the moisture means for actuating the effective temperature member, means for causing the dry bulb temperature means to produce a relatively large part of the movement of the effective temperature member, means for causing the moisture means for producing a relatively small part of the movement of the effective temperature member, and means for causing the dry bulb temperature means to reduce the influence that the moisture means has upon the movement of the effective temperature member as the dry bulb temperature decreases.

20. A device for giving a measurement of the effective temperature in combinations of air motion and temperature which measurement is an index of the thermo-equivalent condition of the body under conditions having a substantially constant relative humidity comprising, in combination, means influenced by the dry bulb temperature, means independent of the temperature and influenced by the air motion, a movable member for giving the measurement of the effective temperatures in combinations of air motion and temperature, means governed by the dry bulb temperature means and the air motion means for actuating the effective temperature member, means for causing the dry bulb temperature means to produce a relatively large part of the movement of the effective temperature member, and means for causing the air motion means to produce a relatively small part of the movement of the effective temperature member.

21. A device giving a measurement of the effective temperature in combinations of air motion and temperature which measurement is an index of the thermo-equivalent condition of the body under conditions having a substantially constant relative humidity comprising, in combination, means influenced by the dry bulb temperature, means independent of the temperature and influenced by the air motion, a movable member for giving the measurement of the effective temperatures in combinations of air motion and temperature, means governed by the dry bulb temperature member, means for causing the dry bulb temperature means to produce a relatively large part of the movement of the effective temperature member, means for causing the air motion means to produce a relatively small part of the movement of the effective temperature member, and means for causing the dry bulb temperature means to increase the influence that the air motion means has upon the movement of the effective temperature member as the dry bulb temperature decreases.

22. A device for giving a measurement of the effective temperature in combinations of moisture and air motions, which measurement is an index of the thermo-equivalent condition of the body under conditions having a substantially constant dry bulb temperature comprising, in combination, means influenced by the moisture, means independent of the temperature and influenced by the air motion, and means influenced by both of said means for giving the said measurement of the effective temperature.

23. A device for giving a measurement of the effective temperature in combinations of moisture and air motions, which measurement is an index of the thermo-equivalent condition of the body under conditions having a substantially constant dry bulb temperature comprising, in combination, means influenced by the moisture, means independent of the temperature and influenced by the air motion, and means receiving motion from each of said foregoing means and resolving said motion into a resultant movement of its own for giving the said measurement of the effective temperature.

24. In an apparatus of the class described, in combination, means movable to give a measurement of dry bulb temperature, means movable to give a measurement of the relative humidity, means movable in accordance with the effective temperature in combinations of moisture and temperature under conditions of substantially constant air motion, means for causing relative movement between the effective temperature means, the relative humidity means and the dry bulb temperature means, and means for opposing the movement of the effective temperature means to transmit movement back to either the dry bulb temperature means or the relative humidity means.

25. In an apparatus of the class described, in combination, means movable to give a measurement of the relative humidity, means movable to give a measurement of the air motion, means movable in accordance with the effective temperature, in combinations of moisture and air motion under conditions having a substantially constant dry bulb temperature, means for causing relative movement between the effective temperature means, the relative humidity means and the air motion means, and means for opposing the movement of the effective temperature means to transmit movement back to either the relative humidity means of the air motion means.

26. In an apparatus of the class described, in combination, means movable to give a measurement of the dry bulb temperature, means movable to give a measurement of the air motion, means movable in accordance with the effective temperature in combinations of dry bulb temperature and air motion under conditions having a substantially constant relative humidity, means for causing relative movement between the effective temperature means, the dry bulb temperature means and the air motion means, and means for opposing the movement of the effective temperature means to transmit movement back to either the dry bulb temperature means or the air motion means.

27. A device for giving measurement that is based upon both the moisture and the dry bulb temperature comprising, in combination, a movable member, means influenced by the moisture for moving the movable member, a second movable member, means for interconnecting the first and the second movable members, means responsive to the dry bulb temperature for varying the interconnecting means to modify the extent of the movement of the second movable member relative to the movement of the first movable member, a third movable member for giving the said measurement, and means responsive to the movement of the second movable member and the dry bulb temperature for actuating the third movable member to give said measurement.

28. A device for giving a measurement of the effective temperature in a space having a substantially constant air velocity comprising in combination, means influenced by the moisture, means influenced by the dry bulb temperature, a movable member actuated by the two foregoing means for giving the said measurement, and compensating means whereby said measurement is based on the particular air velocity within the space.

29. A measuring device for giving a measurement of the effective temperature in combinations of moisture and temperature, which measurement is an index of the thermo-equivalent condition of the body under conditions of substantially constant air motion comprising, in combination, a member movable about an axis to measure the dry bulb temperature, a member movable about an axis to measure the effective temperature, means controllable in accordance with the moisture, means for causing the dry bulb temperature member and the moisture means to actuate the effective temperature member, and compensating means whereby said device may be adjusted to give measurements based on the particular air motion conditions.

30. A device for giving a measurement of the effective temperature, comprising in combination, means influenced by the dry bulb temperature condition, means influenced by the moisture condition, means controllable in accordance with the air motion condition, mechanism governed by the three foregoing means for giving said measurement, and means whereby one of said means may be adjustably set at values that correspond to predetermined constant conditions.

31. In combination, first means controllable in accordance with a first function of the psychrometric condition of air, second means controllable in accordance with a second function of the psychrometric condition of air, third means controllable in accordance with a third function of the psychrometric condition of air, differential means governed by the first and second means, and means governed by said first means, the differential means and the third means.

32. In combination, first means for giving a measurement of a first function of the psychrometric condition of air, second means responsive to a second function of the psychrometric condition of air and the first function of the psychrometric condition of air for giving a subtra-hend value, and means for subtracting the subtrahend value from the measurement of the first means.

33. In combination, a first temperature responsive means, a second temperature responsive means, means actuated by said first and second named means, and means controllable in accordance with air motion for modifying the action of one of said temperature responsive means.

34. In combination, a first means responsive to one function of the psychrometric condition of air, a second means responsive to another function of the psychrometric condition of air, means actuated by said first and second means, and means controllable in responsive to a third function of the psychrometric condition of air to modify the action of one of said first two means.

GEORGE V. WOODLING.